(12) United States Patent
Wood et al.

(10) Patent No.: US 6,885,782 B2
(45) Date of Patent: Apr. 26, 2005

(54) FEEDBACK POLARIZATION CONTROLLER (75) Inventors: Christopher S. Wood, Boulder, CO (US); Terry J. Brown, Lafayette, CO (US); Jason R. Ensher, Lafayette, CO (US)

(73) Assignee: ILX Lightwave Corporation, Bozeman, MT (US)

( * ) Notice: Subject to any disclaimer, the term of this patent is extended or adjusted under 35 U.S.C. 154(b) by 306 days.

(21) Appl. No.: 10/179,807

(22) Filed: Jun. 25, 2002

(65) Prior Publication Data
US 2003/0002768 A1 Jan. 2, 2003

Related U.S. Application Data
(60) Provisional application No. 60/301,174, filed on Jun. 26, 2001.

(51) Int. Cl.[7] ................................................. G02B 6/00
(52) U.S. Cl. ..................... 385/11; 250/227.17; 398/152
(58) Field of Search ....................... 385/11; 250/227.17; 398/152

(56) References Cited

U.S. PATENT DOCUMENTS

| | | |
|---|---|---|
| 3,625,589 A | 12/1971 | Snitzer |
| 3,645,603 A | 2/1972 | Smith |
| 4,384,760 A | 5/1983 | Alferness |
| 4,466,699 A | 8/1984 | Droessler et al. |
| 4,474,424 A | 10/1984 | Wagner |
| 4,550,975 A | 11/1985 | Levinson et al. |
| 4,564,289 A | 1/1986 | Spillman, Jr. |
| 4,729,622 A | 3/1988 | Pavlath |
| 4,753,507 A | 6/1988 | DePaula et al. |
| 4,789,219 A | 12/1988 | Layne |
| 4,813,756 A | 3/1989 | Frenkel et al. |
| 4,861,136 A | 8/1989 | Stone et al. |
| 4,923,290 A | 5/1990 | Brinkmeyer et al. |

(Continued)

*Primary Examiner*—Rodney Bovernick
*Assistant Examiner*—Sung Pak
(74) *Attorney, Agent, or Firm*—Lathrop & Gage LC (57) ABSTRACT

The invention provides a polarization controller to set the state of polarization (SOP) of light in an optical fiber. A plurality of piezoelectric squeezers couple with an electronic drive to apply compression forces to the fiber. The drive applies voltage signals to the squeezers and monitors one or more of (a) a voltage across the squeezer, (b) a capacitance change with the fiber, (c) a force applied to the squeezer, (d) a force applied to the fiber, and (e) a resonance of one or more squeezers. Feedback from one or more of (a)–(e) is used to modify the applied voltage signals in control of the SOP.

27 Claims, 7 Drawing Sheets

U.S. PATENT DOCUMENTS

| | | |
|---|---|---|
| 4,960,319 A | 10/1990 | Dankowych |
| 4,979,235 A | 12/1990 | Rumbaugh et al. |
| 4,988,169 A | 1/1991 | Walker |
| 5,004,312 A | 4/1991 | Shimizu |
| 5,039,201 A | 8/1991 | Liu |
| 5,041,779 A | 8/1991 | Hales |
| 5,062,684 A | 11/1991 | Clayton et al. |
| 5,073,004 A | 12/1991 | Clayton et al. |
| 5,115,480 A | 5/1992 | Large |
| 5,159,481 A | 10/1992 | Maeda |
| 5,191,387 A | 3/1993 | Ichikawa et al. |
| 5,212,584 A | 5/1993 | Chung |
| 5,212,743 A | 5/1993 | Heismann |
| 5,212,745 A | 5/1993 | Miller |
| 5,251,275 A | 10/1993 | Kuriyama et al. |
| 5,283,845 A | 2/1994 | Ip |
| 5,287,214 A | 2/1994 | Robertson et al. |
| 5,336,883 A | 8/1994 | Hobby et al. |
| 5,361,155 A | 11/1994 | Chiaroni et al. |
| 5,408,545 A | 4/1995 | Lee et al. |
| 5,453,827 A | 9/1995 | Lee |
| 5,471,545 A | 11/1995 | Negami et al. |
| 5,481,402 A | 1/1996 | Cheng et al. |
| 5,561,726 A | 10/1996 | Yao |
| 5,592,314 A | 1/1997 | Ogasawara et al. |
| 5,606,439 A | 2/1997 | Wu |
| 5,612,824 A | 3/1997 | Si et al. |
| 5,629,995 A | 5/1997 | Duck et al. |
| 5,633,959 A | 5/1997 | Niki et al. |
| 5,642,448 A | 6/1997 | Pan et al. |
| 5,657,151 A | 8/1997 | Swan et al. |
| 5,666,225 A | 9/1997 | Colbourne |
| 5,682,445 A | 10/1997 | Smith |
| 5,682,452 A | 10/1997 | Takahashi |
| 5,684,632 A | 11/1997 | Shimizu |
| 5,739,945 A | 4/1998 | Yebati et al. |
| 5,799,121 A | 8/1998 | Duck et al. |
| 5,903,684 A | 5/1999 | Payton |
| 5,917,626 A | 6/1999 | Lee |
| 6,005,995 A | 12/1999 | Chen et al. |
| 6,040,944 A | 3/2000 | Pan et al. |
| 6,193,157 B1 * | 2/2001 | Dickson et al. ........ 235/462.01 |
| 6,377,350 B1 | 4/2002 | Paldus et al. |
| 6,381,022 B1 | 4/2002 | Zavracky |
| 2003/0081874 A1 * | 5/2003 | Yao ............................ 385/11 |

\* cited by examiner

FEEDBACK POLARIZATION CONTROLLER

RELATED APPLICATIONS

This application claims priority to U.S. Provisional Application Ser. No. 60/301,174, filed Jun. 26, 2001, entitled, "Feedback Polarization Controller" and is incorporated herein by reference.

BACKGROUND OF THE INVENTION

Polarization controllers are used in many applications relating to fiber-optic test and measurement. These controllers typically utilize piezoelectric transducers as mechanical "squeezers" to alter the state of polarization ("SOP") in an optical fiber. The controllers then monitor the SOP to generate a signal that is in turn used in feedback to control or stabilize SOP. The optical sensors used to monitor SOP generally include polarization optics, photodiodes, and/or complex signal processing electronics used to process signals based, at least in part, on SOP.

Accordingly, one disadvantage with polarization controllers in the prior art is that they process information about SOP, and that this information is in turn used in feedback control of SOP. This feedback is slow and often involves complex feedback electronics; consequently the operation of the controller is slow. Since polarization controllers provide increasing benefit to applications with increasing speed in controlling SOP, there is a need for more efficient and speedier polarization controllers.

The invention solves the afore-mentioned problems, in one object, by controlling SOP through monitoring and controlling forces applied to the fiber, and without feedback of SOP information. Other objects of the invention are apparent within the description that follows.

SUMMARY OF THE INVENTION

The following patents provide useful background information for the invention: U.S. Pat. No. 5,903,684; U.S. Pat. No. 5,682,445; U.S. Pat. No. 5,633,959; U.S. Pat. No. 5,561,726; U.S. Pat. No. 5,471,545; U.S. Pat. No. 5,408,545; U.S. Pat. No. 5,336,883; U.S. Pat. No. 5,212,743; U.S. Pat. No. 5,191,387; U.S. Pat. No. 5,159,481; U.S. Pat. No. 5,115,480; U.S. Pat. No. 5,004,312; U.S. Pat. No. 4,988,169; U.S. Pat. No. 4,979,235; U.S. Pat. No. 4,960,319; U.S. Pat. No. 4,923,290; U.S. Pat. No. 4,753,507; U.S. Pat. No. 4,753,507; U.S. Pat. No. 4,729,622; U.S. Pat. No. 4,564,289; U.S. Pat. No. 4,384,760; U.S. Pat. No. 3,645,603; and U.S. Pat. No. 3,625,589. Each of the afore-mentioned patents is expressly incorporated herein by reference.

The following articles provide useful background information for the invention: M. Johnson, *In-line fiber-optical polarization transformer*, Appl. Opt. 18, p.1288 (1979); R. Ulrich, *Polarization stabilization on single-mode fiber*, Appl. Phys. Lett. 35, p.840 (1979); Kidoh et al., *Polarization control on ouptut of single-mode optical fibers*, IEEE J. Quan. Elec. 17, p. 991 (1981); R. Alferness, *Electrooptic guided-wave device for general polarization transformations*, IEEE J. Quan. Elec. 17, p.965 (1981); Sakai et al., *Birefringence and polarization characteristics of single-mode optical fibers under elastic deformations*, IEEE J. Quan. Elec. 17, p.1041 (1981); R. Noe, *Endless polarization control in coherent optical communications*, Elec. Lett. 22, p.772 (1986); R. Noe, *Endless polarization control experiment with three elements of limited birefringence range*, Elec. Lett. 22, p.1341 (1986); N. Walker et al., *Endless polarization control using four fiber squeezers*, Elec. Lett. 23, p.290 (1987); A. Kersey et al., *Monomode fiber polarization scrambler*, Elec. Lett. 23, p.634 (1987); Tatam et al., *Full polarization state control utilizing linearly birefringent monomode optical fiber*, IEEE J. Lightwave Tech. 5, p.980 (1987); G. Walker et al., *Rugged, all-fiber, endless polarization controller*, Elec. Lett. 24, p.1353 (1988); *2×2 Optical Fiber Polarization Switch and Polarization controller*, Elec. Lett. 24, p.1427 (1988); and S. Siddiqui, *Liquid crystal polarization controller for use in fiber communication systems*, Optical Fiber Conference Proceedings, Wed. afternoon, poster #122 (1989). Each of the afore-mentioned articles is incorporated herein by reference.

The invention of one aspect provides a fiber-based polarization controller. The controller uses one or more piezoelectric squeezers that produce radial forces on a section of single-mode optical fiber. The radial forces change the fiber's birefringence via the photoelastic effect, which changes the SOP of light transmitted through the squeezed section of fiber. The controller also measures these forces in feedback control of the SOP. In the preferred aspects of the invention, the squeezing force exerted by a squeezer is measured by one or more changes in the squeezer's resonant frequency, capacitance, load distribution, and/or applied fiber pressure.

The birefringence induced in the fiber is directly related to the forces exerted on the fiber by each squeezer. In another aspect of the invention, therefore, the measured forces induced on the fiber by a squeezer are used to generate a feedback signal to directly control SOP. Accordingly, information about SOP is not used in the feedback signal; and control of SOP occurs as quickly as the detection of squeezer forces.

In one aspect of the invention, the resonant response from a squeezer is used to determine the force applied to the fiber. This aspect is sometimes called "resonant response detect" herein.

In another aspect, one or more pressure sensors (e.g., strain gauges, force sensing resistors, LVDT devices or pressure detectors) are used at or about the squeezer to determine an applied force. This aspect, sometimes called "pressure detect" herein, may be used independently, or with resonant response detect, and/or with capacitance detect (defined below).

In still another aspect, the capacitance of a coating applied to the fiber is used to determine applied force. Specifically, as the fiber is squeezed, coating capacitance changes, which is measured as a feedback signal of voltage across the capacitor. This aspect is sometimes called "capacitance detect". Capacitance detect may be used independently, or with pressure detect and/or with resonant response detect.

The invention of one aspect provides an improvement to a polarization sensitive optical measurement system. Such a system can include, for example, polarization-dependent loss devices, polarization-mode-dispersion measuring devices, or extinction ratio devices. In accord with the invention, the optical measurement system incorporates a polarization controller, such as described above, to quickly and efficiently control the SOP of incoming electromagnetic energy.

In yet another aspect, the invention provides an improvement to instruments and systems that control polarization. Such instruments and systems can include, for example, bench-top polarization controllers, system-integrated polarization controllers, or PMD compensation devices, each used in a variety of production, system test and networking environments. In operation, a polarization controller of the invention may replace or augment one of these instruments to facilitate improved polarization control for the polarization sensitive application.

The invention thus provides several advantages. The polarization controller may be made with low cost, as compared to the prior art; it may be electronically-controlled; and the controller can operate at high speeds, with reliability and low optical insertion loss. The controller of the invention may also be fit within compact packaging, if desired; and it may function with high optical power handling capability. In one further advantage, the invention may be used to maintain a polarization state over extended periods, with closed-loop control over drifts in the polarization state.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
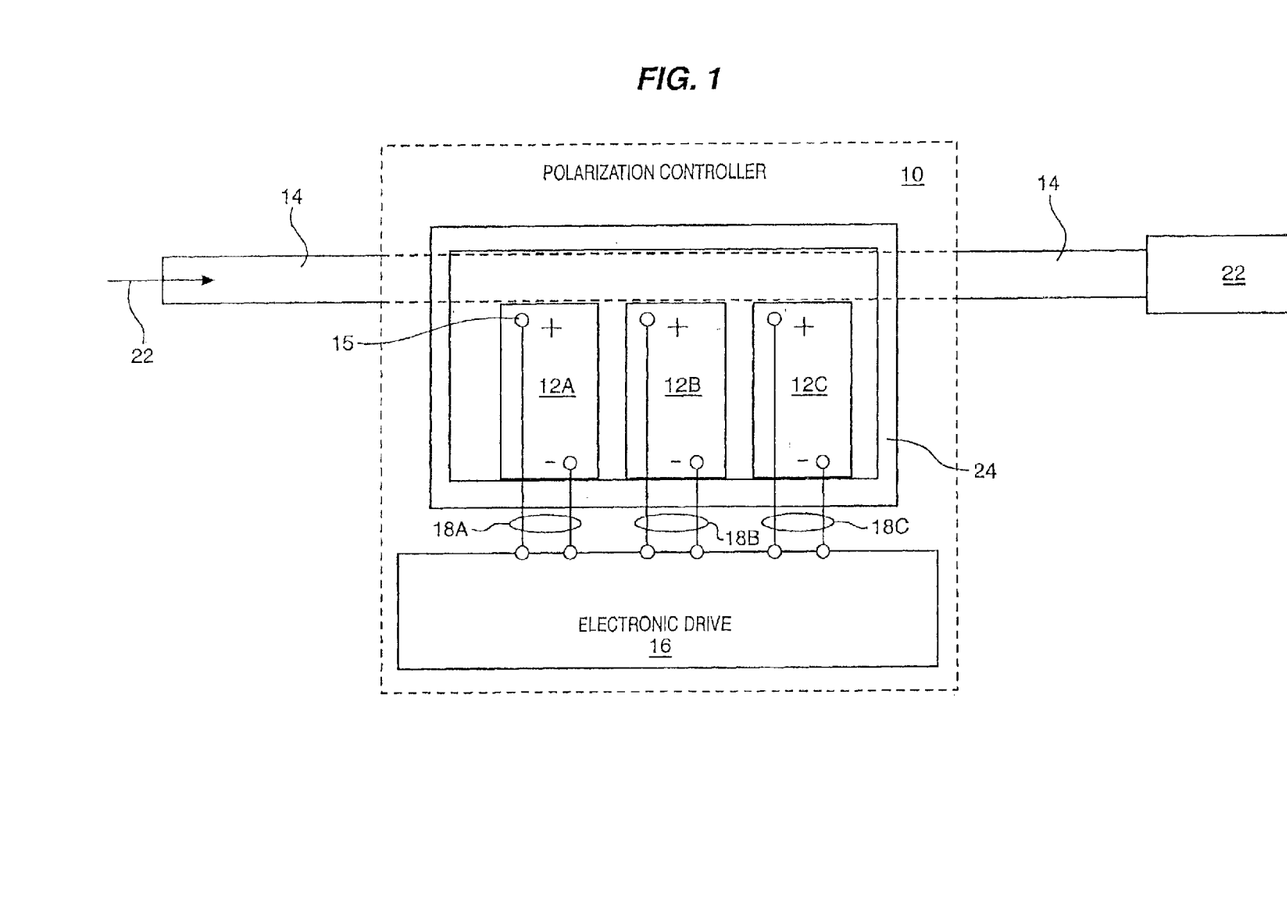
FIG. 1 shows a polarization controller constructed according to the invention.

FIG. 1 shows a fiber-based polarization controller 10 (not to scale) constructed according to the invention. Controller 10 includes a plurality of piezoelectric squeezers 12 arranged such that each squeezer produces a radial force, selectively, onto an optical fiber 14 passing through controller 10. An electric drive 16 electrically connects to each squeezer 12, via corresponding electrical pathways 18, and applies a voltage across each squeezer 12 in a manner that facilitates control of the SOP.

Controller 10 shows three squeezers 12a, 12b, 12c and three corresponding sets of electrical pathways 18a, 18b, 18c connecting squeezers 12a, 12b, 12c, respectively, to electronic drive 16. Those skilled in the art should appreciate that more or fewer squeezers 12 may be implemented within controller 10 without departing from the scope of the invention. In particular, one squeezer 12a may function as a polarization controller 10 in accord with the invention. Those skilled in the art should also appreciate that the arrangement of, and the electrical connections 15 to and between, electronic drive 16, pathways 18 and squeezers 12 are shown for purposes of illustration, and not in a limiting way; and that a variety of connections and transducer arrangements may be made within the scope of the invention.

In operation, electronic drive 16 applies a voltage to each squeezer 12. A housing 24 illustratively surrounds squeezers 12 so as to leverage compression forces between squeezers 12 and fiber 14. The application of force onto fiber 14 by any squeezer 12 alters the polarization properties of fiber 14, such as birefringence, via the photoelastic effect. By applying force to fiber 14 in a desired manner, birefringence is thus altered, which changes the SOP. Specifically, electronic drive 16 applies a voltage to any squeezer 12 and then monitors the force applied to fiber 14—by resonant response detect, pressure detect, and/or capacitance detect—to control the SOP for downstream electro-optical systems, devices or components 22.

The invention thus provides advantages by actively controlling the SOP via monitoring forces applied onto optical fiber 14. As known to those skilled in the art, a voltage applied across any squeezer 12 extends the length of the piezoelectric element to apply a corresponding force onto fiber 14, compressed between squeezer 12 and housing 24. Accordingly, by calibrating the voltage across a squeezer 12 to an applied force, the SOP may be controlled; i.e., for each voltage applied by drive 16, a corresponding SOP results in fiber 14. However such a simple technique is likely insufficient without active feedback, such as described in the following embodiments.

Specifically, controller 10 usually applies simultaneous and independent forces to fiber 14 via each squeezer 12a–12c to define a given SOP. However, over extended periods of time, it is difficult to maintain consistent forces; and thus it is correspondingly difficult to maintain the SOP. This difficulty is created, in part, because: (a) the piezoelectric squeezers 12 individually tend to drift with regard to the force applied to fiber 14; (b) housing 24 tends to mechanically settle or move, modifying the compression forces on fiber 12; (c) the specific voltage applied to squeezers 12 can drift, causing a corresponding drive in the forces applied to fiber 12; and (d) squeezers 12 exhibits hysteresis, meaning that the absolute squeezing force applied to fiber 14 depends on whether the previous voltage was less than, or greater than, a current applied voltage. Accordingly, if drive 16 returns to apply the same voltage to a given squeezer, it does not necessarily mean that the same force is applied to fiber 14. In sum, it is generally insufficient to apply a simple voltage to squeezers 12 to obtain a reliable, low-drift polarization controller.

Figure 2:
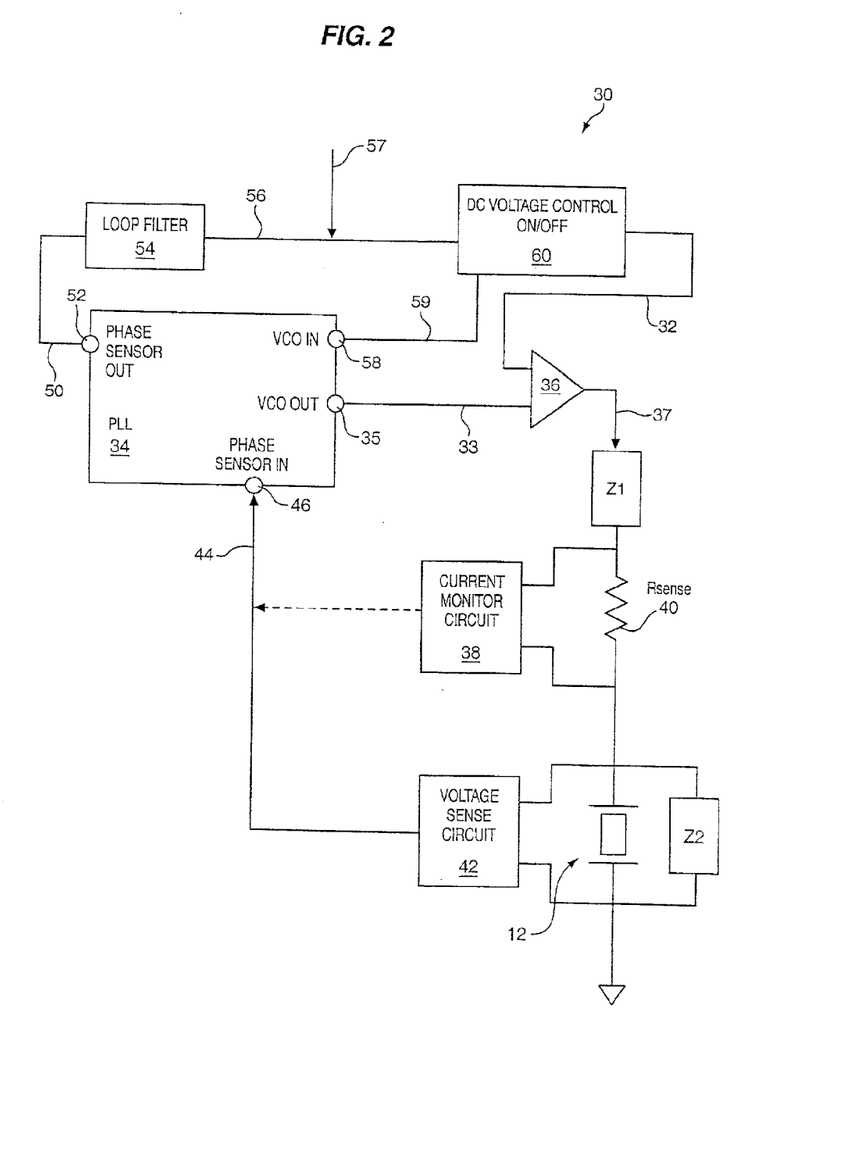
FIG. 2 schematically illustrates one circuit suitable for driving a piezoelectric squeezer in accord with the invention.

Accordingly, polarization controller 10 preferably monitors actual squeezing forces applied to fiber 14, rather than simply the voltage applied to each squeezer 12. As mentioned above, one way to determine force is through resonant response detection. Since the mechanical resonant frequency of a squeezer 12 is a function of the compression forces applied to it, the monitoring of its resonant frequency, relative to applied voltage, provides an effective calibration for the absolute force generated by squeezer 12 on fiber 14. This force is detected, by certain teachings herein, using closed-loop control to stabilize the mechanical resonant frequency of squeezer 12 by adjusting the applied DC voltage. Although the DC voltage may drift, and although squeezer and housing structures 12, 24 may drift, the mechanical resonant frequency is held to a particular value—set by a user and representing a constant squeezing force onto fiber 14. To vary the force, or the polarization state, a user adjusts the resonant frequency. Circuitry, described below, measures actual resonance and compares that to the frequency set by the user; thereafter the DC applied voltage is adjusted to make the two frequencies identical. FIG. 2 describes these operations in more detail.

FIG. 2 shows a schematic of one electronic circuit 30 illustrating an electrical and feedback relationship between drive 16 and one squeezer 12 of FIG. 1. An adjustable, analog DC voltage 32 is applied to squeezer 12 to set the SOP. A small amplitude oscillatory voltage 33 is generated, at VCO out 35, by the voltage controlled oscillator ("VCO") of a phase-locked loop ("PLL") chip 34 and added to DC voltage 32 via summing circuit 36 to provide voltage 37 to squeezer 12. PLL 34 thus produces an oscillatory voltage across piezoelectric squeezer 12. The frequency of oscillating voltage 33 is chosen to be at or near to one of the mechanical resonance frequencies of squeezer 12. The choice of resonant frequency is a matter of design choice, for example depending on Q-factor, response amplitude, and sensitivity to environmental factors like temperature.

The response of squeezer 12 to oscillating voltage 33 is also measured by one of two alternative techniques, both shown in FIG. 2 for purpose of illustration. In a first technique, a sense voltage proportional to the squeezer's drive current, determined by current monitor circuit 38, is measured across a sense resistor 40 in series with squeezer 12. In a second technique, a voltage sense circuit 42 measures a voltage across squeezer 12. In either technique, a voltage 44 indicative of the oscillatory behavior of squeezer 12 is fed to the phase sensor input 46 of PLL 34. PLL 34 compares the phase of signal 44 to VCO drive voltage 33 and generates an error voltage 50, proportional to phase error, at the phase sensor output 52. Phase error voltage 50 between the VCO drive voltage 33 and voltage 44 is sent to loop filter 54. The gain and bandwidth of loop filter 54, and overall phase connections, are set to maintain lock over a reasonable frequency range with little drift. The output voltage 56 from loop filter 54 returns to VCO input 58, as signal 59, when a DC voltage control 60 is set to "lock". The VCO of PLL 34 then changes frequency to maintain lock corresponding to the mechanical resonance of squeezer 12. Loop filter output voltage 56 is also preferably summed with an adjustable DC voltage 57, setting VCO frequency in the absence of an error voltage signal 50. When the phase difference between drive voltage 33 and monitor voltage 44 is at or near zero, the AC component of the voltage across squeezer 12 is driven at or near the resonance frequency of the squeezer.

The desired SOP is then reached by adjusting voltage 37 across squeezer 12 by changes to adjustable DC voltage 57. During the adjustment of voltage 37, control 60 is in unlock mode: the output of loop filter 54 is connected exclusively to VCO In 58 and PLL 34 maintains the VCO frequency at the resonance of the squeezer. When the final SOP is reached, control 60 is set to lock mode: part of the output of loop filter 54 is sent to an analog control of the adjustable voltage source (e.g., drive 16, FIG. 1) that drives squeezer 12 with voltage 32. Phase error voltage 50 from PLL 34 corrects changes in squeezer resonant frequency (i.e., the force applied to fiber 14) by changing voltage 37 across squeezer 12.

A practical concern is that the mechanical resonances of the squeezers may not be suitable for providing a stable, robust or substantial feedback signal. Preferably, circuit 30 includes circuit elements that adjust the resonant Q-factor. For example, decreasing the Q, without substantially altering frequency response, increases the range over which PLL 34 can track the resonance frequency as the adjustable DC voltage 57 changes the SOP. Optionally, therefore, circuit element Z1 is included to increase the damping of circuit 30; element Z1 can for example include inductors and resistors in series. Alternatively, circuit element Z1 may decrease the damping of circuit 30, thereby narrowing the resonance, tightening the lock by decreasing the excursions from resonance and by increasing the feedback signal. Circuit element Z2, representing an inductor in parallel with squeezer 12, may also be optionally included to resonate at frequency $(LC)^{-1/2}$, defined by internal L, C components. The frequency defined by LC may be at or near to the mechanical resonance of squeezer 12; this further broadens the resonant response of circuit 30 for a given amplitude. Or, the LC frequency may be at a frequency far from mechanical resonance, but convenient for the lock-circuit bandwidth, enabling PLL 34 to phase lock on an electrical resonance formed of the parallel inductor Z2 and the capacitance of squeezer 12. Those skilled in the art should appreciate that elements Z1, Z2 may include inductors, capacitors, resistors, transistors, op amps, diodes and/or other electrical components as a matter of design choice to provide like functionality.

PLL 34 may for example be a microchip of common design, including the 0 or 90 degree feedback PLL. However, PLL 34 can also be constructed through discrete components, as known in the art. Those skilled in the art should also appreciate that the functions of PLL 34 may be implemented with a frequency lock circuit, such as those using modulating/demodulating techniques, or with a self-resonant circuit. The feedback to PLL 34 may further derive from signals generated from additional squeezers 12 or other devices.

Figure 3:
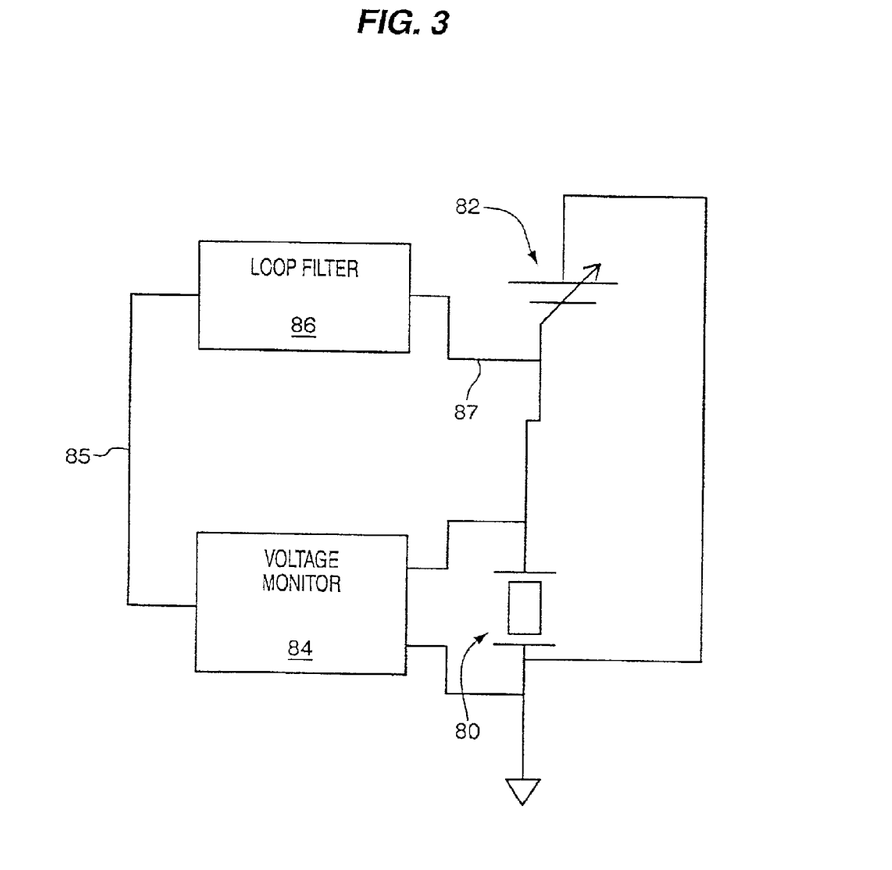
FIG. 3 schematically illustrates a voltage or current sense technique for controlling SOP, in accord with the invention.

In a simplification of certain functions of FIG. 2, FIG. 3 shows a representative squeezer 80 coupled to a voltage source 82 (e.g., electronic drive 16 may function as voltage source 82) such that an adjustable DC voltage is applied to squeezer 80. Voltage from source 82 is measured, via a voltage monitor circuit 84, and fed back on signal line 85 to a loop filter 86. When controller 10 is locked, loop filter 86 generates a correction voltage 87 summed with voltage from source 82 across squeezer 80, to maintain the SOP.

Figure 4:
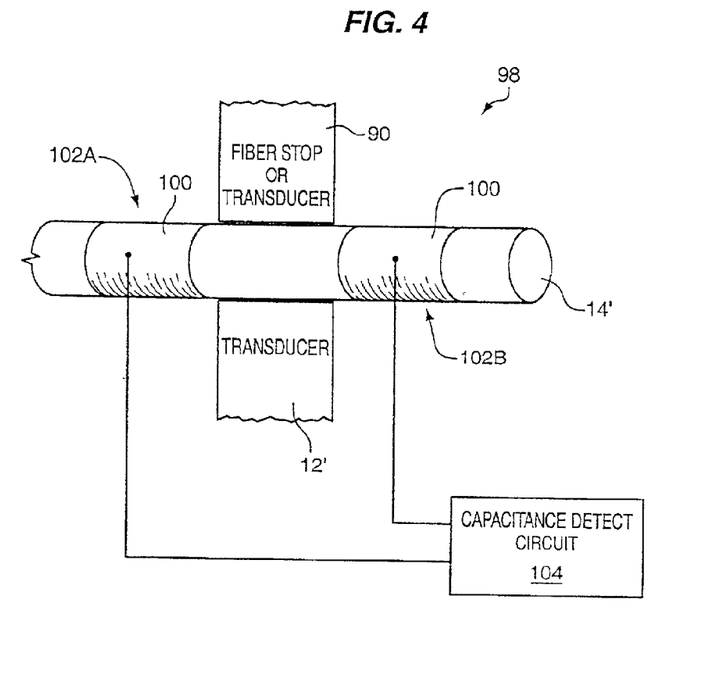
FIG. 4 and FIG. 4A show alternative capacitance detect techniques for sensing forces applied to a fiber within a polarization controller of the invention.
Figure 4A:
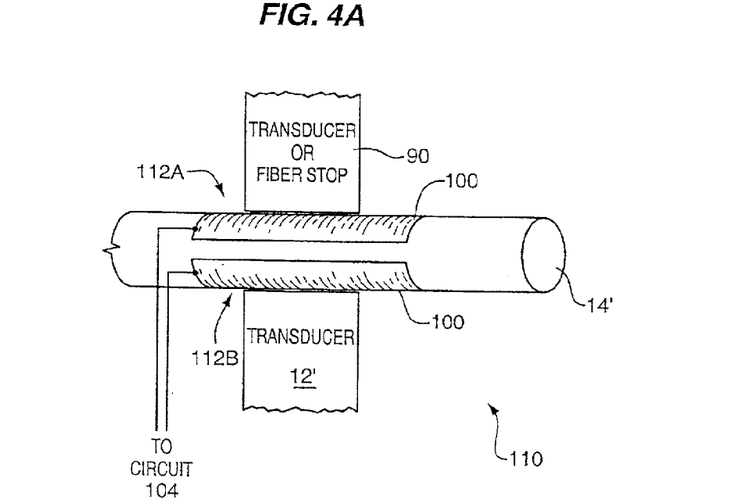

FIG. 4 and FIG. 4A each show a capacitance detect technique for determining forces applied to a fiber 14' in a controller of the invention, e.g., controller 10, FIG. 1. As shown by technique 98, squeezer 12' applies force onto fiber 14' by compression with fiber stop 90; squeezer 12' expands with applied voltage, as described above. Fiber stop 90 may for example be part of housing 24, FIG. 1. In FIG. 4, a conductive (e.g., metal) film 100 applied to fiber 14' in two different sections 102a, 102b. Coatings 100 at sections 102a, 102b form a capacitor with fiber 14'; a capacitance detect circuit 104 connects with sections 102a, 102b, as shown. When controller 10 squeezes fiber 14', a capacitance change is detected by circuit 104. In FIG. 4A, a similar capacitance detect technique 110 is shown, with metal film 100 applied to two sections 112a, 112b. Similarly, sections 112a, 1 12b connect to a capacitance detect circuit 104.

Figure 5:
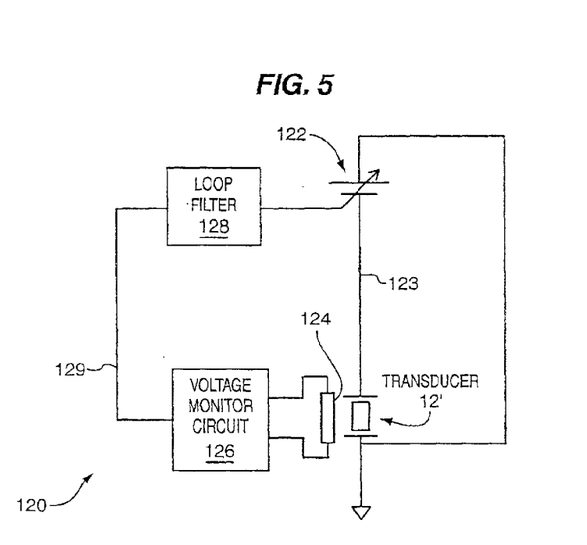
FIG. 5 shows a feedback circuit for use with capacitance detect or pressure detect techniques for measuring fiber force, in accord with the invention.
Figure 6:
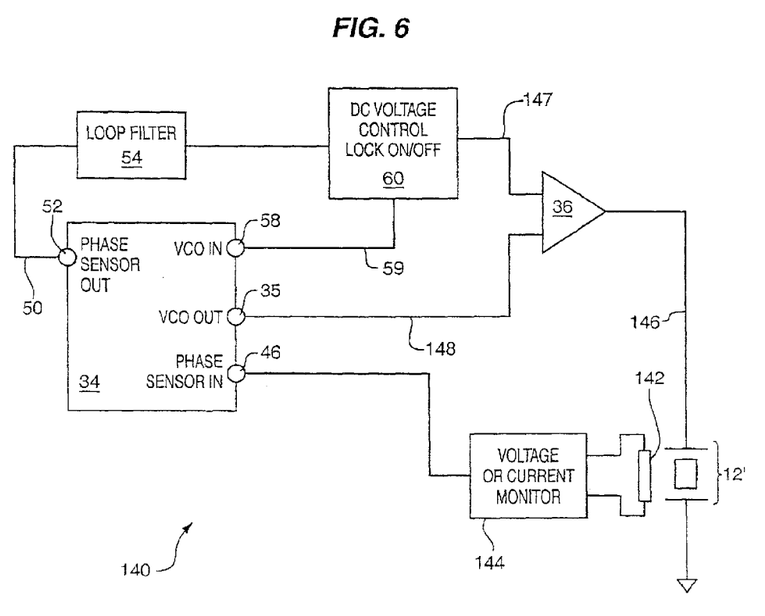
FIG. 6 shows an alternative feedback circuit for use with capacitance detect or pressure detect techniques for measuring fiber force, in accord with the invention.

Circuit 104 preferably couples within one of the above-described feedback systems, such as circuit 30, FIG. 2. FIG. 5 and FIG. 6 illustrate optional feedback configurations of circuit 104 with capacitance detect techniques 98, 110. Specifically, in FIG. 5 a feedback circuit 120 is shown with a DC voltage source 122 applying voltage 123 to squeezer 12'. Capacitance detect circuit 104 couples with circuit 120 such that capacitance detect information from fiber 124 (e.g., fiber 14', FIG. 4) is available for voltage monitor circuit 126. A voltage 129 from voltage monitor circuit 126 is input as feedback to loop filter 128. Circuit 120 thus changes voltage 123 from source 122 to maintain the SOP based upon forces determined by capacitance detect and applied to fiber 124.

In FIG. 6, a capacitance detect circuit 104 may also couple with feedback circuit 140 so as to provide capacitance detect information of a fiber 142 (e.g., fiber 14', FIG. 7) to a voltage or current monitor 144. Squeezer 12' responds to an applied voltage 146 to apply force onto fiber 142. An oscillatory voltage 148 perturbs voltage 147 (provided from the primary voltage source, e.g., drive 16, FIG. 1) at a frequency near the resonance of squeezer 12', as described above. Elements 34, 36, 54, 60 provide like functionality as described in FIG. 2. To maintain SOP, circuit 140 thus changes applied voltage 146 in response to applied forces onto squeezer 12', as determined by forces on fiber 142 detected through capacitance detect.

Figures 7, 7A, 7B, 7C:
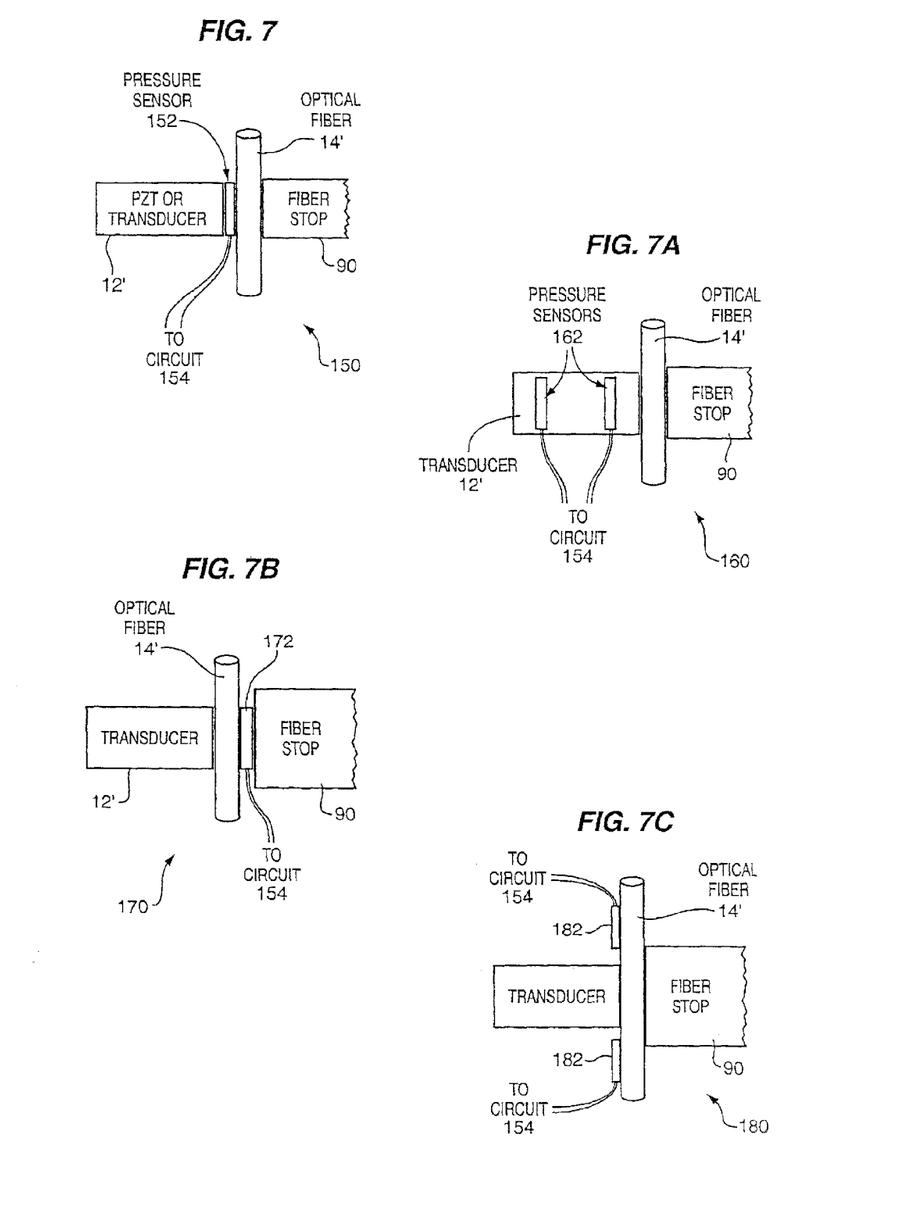
FIGS. 7, 7A, 7B and 7C show alternative pressure detect techniques for sensing force applied to a fiber with a polarization controller of the invention.

FIGS. 7–7C each show a pressure detect technique for determining forces applied to a fiber 14' in a controller of the invention, e.g., controller 10, FIG. 1. As shown, squeezer 12' applies force onto fiber 14' by compression with fiber stop 90; squeezer 12' expands with applied voltage, as described above. Fiber stop 90 may for example be part of housing 24, FIG. 1. In FIG. 7, a pressure detect technique 150 is shown with a pressure sensor 152 sensing pressure corresponding to forces applied to fiber 14'. Signals from pressure sensor 152 are communicated to pressure detect circuit 154 for use with a feedback circuit, described below. In FIG. 7A, a pressure detect technique 160 is shown with one or more pressure sensors 162 sensing pressure corresponding to forces applied to squeezer 12' (and hence the forces onto fiber 14'). Sensors 162 may be built onto, or integrally with, squeezer 12'. Signals from pressure sensors 162 are communicated to pressure detect circuit 154 for use with a feedback circuit, described below. In FIG. 7B, a pressure detect technique 170 is shown with a pressure sensor 172, sensing pressure corresponding to forces applied to fiber 14'. Signals from pressure sensor 172 are communicated to pressure detect circuit 154 for use within a feedback circuit, described below. In FIG. 7C, a pressure detect technique 180 is shown with one or more pressure sensors 182 sensing pressure corresponding to strain forces applied to fiber 14'. Signals from pressure sensors 182 are communicated to pressure detect circuit 154 for use within a feedback circuit, described below. The positioning of pressures sensors in FIGS. 7–7C maybe made to maximize responsiveness to applied forces on fiber 14', such as at a node of oscillation or resonance. A pair of sensors, e.g., sensors 162, may further be mounted to function like a node-detector, known in the art to increase signal strength through equal and opposite force detection.

Circuit 154 preferably couples within one of the above-described feedback systems, such as circuit 30, FIG. 2. FIG. 5 and FIG. 6 illustrate optional feedback configurations using circuit 154 with pressure detect techniques 150, 160, 170, 180. Specifically, in FIG. 5 a feedback circuit 120 is shown with a DC voltage source 122 applying voltage 123 to squeezer 12'. Pressure detect circuit 154 couples with circuit 120 such that pressure information from fiber 124 (e.g., fiber 14', FIG. 4) is available for voltage monitor circuit 126. A voltage 129 from voltage monitor circuit 126 is input as feedback to loop filter 128. Circuit 120 thus changes voltage 123 from source 122 to maintain the SOP based upon forces determined by pressure detect and applied to fiber 124.

In FIG. 6, a pressure detect circuit 154 may also couple with feedback circuit 140 so as to provide pressure detect information of a fiber 142 (e.g., fiber 14', FIG. 5) to a voltage or current monitor 144. Squeezer 12' responds to an applied voltage 146 to apply force onto fiber 142. An oscillatory voltage 148 perturbs voltage 147 (provided from the primary voltage source, e.g., drive 16, FIG. 1) at a frequency near the resonance of squeezer 12', as described above. Elements 34, 36, 54, 60 provide like functionality as described in FIG. 2. To maintain SOP, circuit 142 thus changes applied voltage 146 in response to applied forces onto squeezer 12' as determined through pressure detect of forces on fiber 142.

Figure 8:
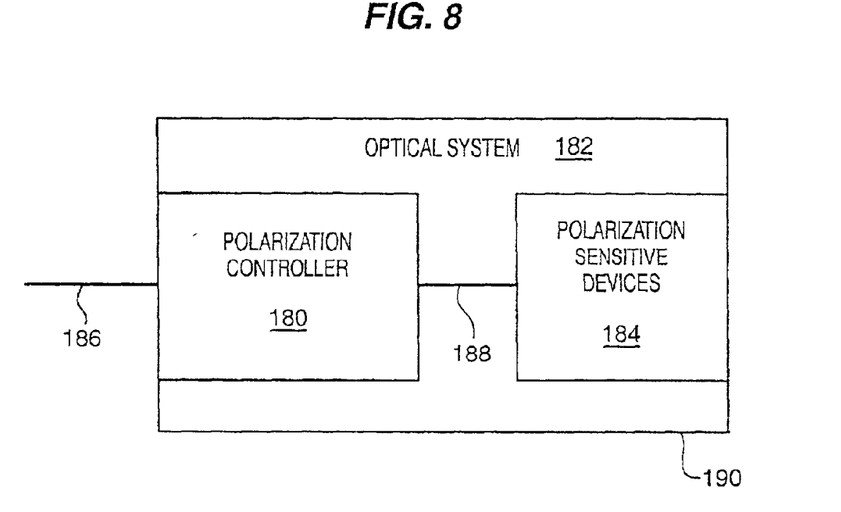
FIG. 8 illustrates how a controller of the invention may be used to augment and improve optical systems requiring polarization control.

FIG. 8 illustrates how a polarization controller 180 of the invention may be used in the improvement of an optical system 182 benefiting from polarization control. By way of example, system 182 may include one or more polarization-dependent loss or polarization-mode-dispersion devices 184. A fiber 186 accepts electromagnetic inputs to system 182, and controller 180 processes the inputs to provide a designated SOP 188 to devices 184. As appropriate, controller 180 may be made within the housing 190 of system 182 so as to provide a modular package for users of system 182.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A polarization controller to control the state of polarization through an optical fiber, comprising a plurality of piezoelectric squeezers and an electronic drive, each squeezer responsive to drive signals from the electronic drive to induce radial compression forces onto the fiber, wherein the electronic drive senses the applied forces in feedback to adjust the drive signals so as to set the state of polarization.

2. A controller of claim 1, wherein the fiber has an axis and wherein the plurality of squeezers comprise two or more squeezers arranged serially along an axial portion of the fiber, each squeezer applying the radial compression forces onto the fiber at a circumferential offset angle around the fiber axis relative to any adjacent squeezer.

3. A controller of claim 1, wherein the electronic drive senses one or both of frequency and amplitude of squeezer resonance as a measure of the applied forces to adjust the drive signals.

4. A controller of claim 3, wherein the resonance comprises mechanical resonant characteristics of the squeezer.

5. A controller of claim 3, wherein the resonance comprises (a) electrical resonant characteristics of the electronic drive and (b) one or more of electrical and mechanical resonant characteristics of the squeezer.

6. A controller of claim 1, further comprising one or more pressure sensors attached to one or both of (a) one or more squeezers and (b) the fiber, the sensors providing a signal to the electronic drive as a measure of the applied forces such that the drive adjusts the drive signals to set the state of polarization.

7. A controller of claim 1, further comprising a first conductive coating applied to the fiber and a second conductive coating applied to the fiber, the first and second coatings forming a capacitor with the fiber, wherein the electronic drive senses capacitance change as a measure of the applied forces to adjust the drive signals.

8. A method of controlling a state of polarization through a fiber receiving compression forces from a plurality of piezoelectric squeezers, comprising the steps of applying voltage signals to the squeezers, applying one or more oscillating voltage signals to the squeezers to induce resonance in each of the squeezers, sensing feedback signals representative of the resonance, coupling the oscillating signals with the feedback signals in a feedback control loop to lock an average state of polarization, wherein the step of coupling the oscillating signals with the feedback signals comprises comparing phases of the signals through a phase-locked loop, and generating an error signal, indicative of phase error, to drive the feedback control loop to stable resonance.

9. A method of claim 8, wherein the step of applying one or more oscillating voltage signals to induce resonance comprises applying the voltage signals to induce a mechanical resonance.

10. A method of claim 8, wherein the step of applying one or more oscillating voltage signals to induce resonance comprises applying the voltage signals to induce an electrical resonance.

11. A method of claim 8, wherein the step of generating one or more oscillating signals comprises utilizing one or more voltage controlled oscillators.

12. A method of claim 8, wherein the step of coupling the oscillating signals with the feedback signals comprises utilizing a self-resonant circuit.

13. A method of claim 8, wherein the step of sensing feedback signals comprises sensing drive current of each squeezer.

14. A method of claim 8, wherein the step of sensing feedback signals comprises determining a voltage across the squeezer.

15. A method of claim 8, further comprising adding a DC voltage to the error signal to provide a VCO center frequency.

16. A method of claim 8, further comprising providing DC voltage control to switch the feedback control loop on and off.

17. A method of claim 8, wherein the step of sensing feedback signals comprises detecting capacitance changes associated with the fiber.

18. A method of claim 8, wherein the step of sensing feedback signals comprises sensing forces of one or both of the fiber and at least one squeezer.

19. A method of claim 18, wherein the step of sensing forces comprises utilizing one or more pressure sensors coupled with at least one of the fiber and squeezer.

20. A method of claim 19, wherein the pressure sensors are selected from the group consisting of pressure detectors, force sensing resistors, strain gauges, and LVDT devices.

21. A method of controlling a state of polarization through a fiber receiving compression forces from one or more piezoelectric squeezers, comprising the steps of applying signals to the squeezers, sensing feedback voltage signals representative of actual voltages across the squeezers, and coupling the feedback voltage signals through a loop filter to adjust the signals in a feedback control of the state of polarization.

22. In a polarization sensitive optical system receiving electromagnetic energy from an optical fiber, the improvement comprising a polarization controller having a plurality of piezoelectric squeezers, and an electronic drive, each squeezer responsive to drive signals from the electronic drive to induce radial compression forces onto the fiber, the drive sensing the forces in feedback to control the drive signals to set a state of polarization through the fiber.

23. In a polarization sensitive optical system of claim 22, the improvement wherein the electronic drive senses one or more of the following in determining the forces: (a) a voltage across the squeezer, (b) a capacitance change with the fiber, (c) a force applied to the squeezer, and (d) a force applied to the fiber.

24. In an optical system of claim 22, the improvement wherein the electronic drive senses a mechanical squeezer resonance in determining the forces.

25. In an optical system of claim 24, the further improvement wherein the electronic drive senses an oscillation characterized by one of frequency, voltage amplitude or current amplitude in sensing the mechanical squeezer resonance.

26. In an optical system of claim 22, the improvement wherein the electronic drive senses an electrical resonance associated with one of the squeezer or electronic drive in determining the forces.

27. In an optical system of claim 26, the further improvement wherein the electronic drive senses an oscillation characterized by one of frequency, voltage amplitude or current amplitude in sensing the electrical resonance.

* * * * *

UNITED STATES PATENT AND TRADEMARK OFFICE
CERTIFICATE OF CORRECTION

PATENT NO. : 6,885,782 B2
DATED : April 26, 2005
INVENTOR(S) : Christopher S. Wood, Terry J. Brown and Jason R. Ensher It is certified that error appears in the above-identified patent and that said Letters Patent is hereby corrected as shown below:

Column 7,
Line 48, "maybe" should read -- may be --.

Signed and Sealed this

Twentieth Day of September, 2005

JON W. DUDAS
*Director of the United States Patent and Trademark Office*